United States Patent [19]

Furuya

[11] Patent Number: 4,582,390

[45] Date of Patent: Apr. 15, 1986

[54] DIELECTRIC OPTICAL WAVEGUIDE AND TECHNIQUE FOR FABRICATING SAME

[75] Inventor: Kazuhito Furuya, Hazlet, N.J.

[73] Assignee: AT&T Bell Laboratories, Murray Hill, N.J.

[21] Appl. No.: 337,142

[22] Filed: Jan. 5, 1982

[51] Int. Cl.[4] .............................................. G02B 6/10
[52] U.S. Cl. ................................................. 350/96.12
[58] Field of Search ..................... 350/96.12; 148/174, 148/175; 29/576 R, 577 C

[56] References Cited

U.S. PATENT DOCUMENTS 3,833,435  9/1974  Logan et al. ........................... 350/96
3,865,646  2/1975  Logan et al. ........................ 350/96.12

*Primary Examiner*—William L. Sikes
*Assistant Examiner*—Robert E. Wise
*Attorney, Agent, or Firm*—Bernard Tiegerman

[57] ABSTRACT

A multilayer dielectric optical waveguide (30, 40) is formed on a III-V semiconductor substrate layer (6) comprised of either InGaAsP or AlGaAs. A lower cladding layer (30) of dielectric material such as $SiO_x$, ($x \sim 2$) having a lower index of refraction than the substrate layer is directionally deposited on an exposed surface (17) of the substrate layer by a controlled evaporation process. A core layer (40) is fabricated on the lower cladding layer by coating an exposed surface (31) of the lower cladding layer with a dielectric material having an index of refraction greater than the index of the cladding layer. One material useful as the core layer is polyimide. Both one-dimensional (FIG. 8) and two-dimensional (FIG. 10) waveguides are capable of being made by appropriate addition of an upper cladding layer (50 or 60) about the core layer. The refractive index of the upper cladding layer is less than the refractive index of the core layer.

16 Claims, 10 Drawing Figures

DIELECTRIC OPTICAL WAVEGUIDE AND TECHNIQUE FOR FABRICATING SAME

TECHNICAL FIELD

The present invention relates to the field of integrated optics and, particularly, to monolithic integration of active and passive optical circuit components on a single substrate.

BACKGROUND OF THE INVENTION

Integration of optical circuit components has been established for a number of years. Two integration methodologies have been developed during this time. A first methodology involves the fabrication of dielectric waveguides on a silicon (Si) wafer substrate. A second methodology utilizes semiconductor material for fabricating waveguides in a GaAs/AlGaAs optical crystal.

Within the first methodology, several techniques have been reported for accomplishing fabrication of a dielectric waveguide on the silicon substrate. See, for example, W. Stutius et al., "Silicon nitide films on silicon for optical waveguides," Appl. Optics, Vol. 16, pp. 3218–3222, December 1977; G. Marx et al., "Integrated Optical Detector Array, Waveguide, and Modulator Based on Silicon Technology," IEEE J. of Solid-State Circuits, Vol. SC-12, pp. 10–13, February 1977; J. Boyd et al., "An Integrated Optical Waveguide and Charge-Coupled Device Image Array," IEEE J. of Quantum Electronics, Vol. QE-13, pp. 282–287, April 1977, and "Integrated optical silicon photodiode array," Appl. Optics, Vol. 15, pp. 1389–1393, June 1976. Stutius et al. show a silicon nitride ($Si_3N_4$) thin film waveguide grown by low-pressure chemical vapor deposition on a silicon dioxide ($SiO_2$) buffer layer. The $SiO_2$ buffer layer is a steam oxide layer grown at 1100 degrees Centigrade in a conventional horizontal reactor. In the Marx et al. reference, a hybrid, i.e., nonmonolithic, integrated optical circuit is shown wherein a Corning 7059 glass waveguide film interconnects devices by taper coupling. The 7059 glass waveguide film is sputtered onto a $SiO_2$ buffer layer which is thermally grown at high temperature on a silicon substrate. Boyd et al. describe an integrated optical component structure incorporating a taper-coupled, KPR photoresist waveguide spin-coated on a $SiO_2$ buffer layer which is thermally grown at high temperature over a silicon substrate.

Although the techniques of Stutius et al., Marx et al., and Boyd et al. appear to offer approaches to integrating certain optical components with dielectric waveguides, their reliance on silicon technology and on high temperature thermal growth of the $SiO_2$ buffer layer cause these techniques to be inapplicable for monolithic integration on optical crystals such as AlGaAs/GaAs and InGaAsP/InP heterostructures. Silicon technology is a limitation on the applicability of these techniques for monolithic integration because the bandgap structure of silicon is not conducive to fabrication of efficient active optical circuit components such as light sources on the silicon wafer substrate. Thermal growth is also a limitation on applicability because the temperatures involved in the thermal growth process are considerably higher than the melting point temperatures of optical crystals in the AlGaAs/GaAs system or the InGaAsP/InP system.

As mentioned above, the second integration methodology provides an approach for fabricating semiconductor waveguides in optical crystals of the AlGaAs/GaAs system. This methodology has resulted in the monolithic integration of active and passive optical circuit components such as light sources, modulators, amplifiers, detectors and couplers, as described in the references cited below. J. L. Merz et al., "Integrated $GaAs-Al_xGa_{1-x}As$ injection lasers and detectors with etched reflectors," Appl. Phys. Lett., Vol. 30, pp. 530–533, May 1977, disclose monolithic integration of a GaAs double heterostructure laser with a passive waveguide and an external cavity detector in a four layer $GaAs-Al_xGa_{1-x}As$ device. The integration of a detector or modulator with a large optical cavity, distributed Bragg reflector laser has been achieved by M. Shams et al. as disclosed in "Monolithic integration of GaAs-(GaAl)As light modulators and distributed-Bragg-reflector lasers," Appl. Phys. Lett., Vol. 32, pp. 314–316, March 1978. K. Aiki et al. in an article, "Frequency multiplexing light source with monolithically integrated distributed-feedback diode lasers," Appl. Phys. Lett., Vol. 29, pp. 506–508, October 1976, have fabricated six distributed feedback lasers on a single chip with the laser outputs, at different frequencies being multiplexed into a single waveguide. Utilizing an integrated twin guide structure, K. Kishino et al. have demonstrated the coupling of two devices to a passive waveguide in an article, "Monolithic integration of laser and amplifier/detector by twin-guide structure," Japan J. Appl. Phys., Vol. 17, pp. 589–590, March 1978.

For the approaches described above in relation to the second methodology, the passive waveguide is a layer of semiconductor material which is substantially transparent to the lightwaves conducted therein. Variations in the thickness and the refractive index of the waveguide layer as well as the coupling length of the device affect proper operation of the resulting integrated optical circuit. In order to control these variations, close monitoring is required for, and increases the complexity of, crystal growth processes employed in this integration methodology.

Although it is well known that dielectric waveguides of the first methodology are more efficient than semiconductor waveguides of the second methodology, the proponents of the two methodologies described above have failed to address the problem of fabricating a monolithically integrated optical circuit which includes dielectric optical waveguides.

SUMMARY OF THE INVENTION

Monolithic integration on a III-V heterostructure optical crystal is accomplished with dielectric optical waveguides in accordance with this invention. The dielectric waveguides are formed on either an $Al_zGa_{1-z}As$ waveguide substrate layer in a AlGaAs/GaAs system or an $In_{1-y}Ga_yAs_xP_{1-x}$ waveguide substrate layer in an InGaAsP/InP system. Each waveguide includes at least a first layer of dielectric material such as $SiO_2$ having a refractive index substantially lower than the refractive index of the substrate layer. The first layer is formed by controlled, low temperature deposition of evaporated $SiO_2$ on the substrate layer. Generally, the first layer acts as a lower cladding layer.

A second layer acting as a core layer of the dielectric optical waveguide is formed by coating the first layer with a dielectric material having a refractive index higher than the refractive index of first layer. One dielectric material suitable for spin coating as a core layer is polyimide. Waveguide shape in the direction of light propagation is defined by selective removal of portions of the core layer through appropriate masking and etching techniques.

A third layer acting as an upper cladding layer of the dielectric optical waveguide is deposited or spincoated over the core layer. The upper cladding layer exhibits an index of refraction which is lower than the index of refraction for the core layer. Composition of the upper cladding layer can be substantially identical to the composition of the lower cladding layer to avoid asymmetry in the propagation characteristics of the optical waveguide. The upper cladding layer also passivates the surface of the entire integrated circuit. Where the waveguide shape is defined, the core layer is completely surrounded by both cladding layers, which results in a two-dimensional dielectric optical waveguide. Where no waveguide shape is defined in the direction of light propagation, the core layer is bounded on only two parallel sides by the cladding layers, which results in a one-dimensional dielectric optical waveguide.

BRIEF DESCRIPTION OF THE DRAWINGS

A more complete understanding of the invention may be obtained by reading the following description of a specific illustrative embodiment of the invention in conjunction with the appended drawings in which.

DETAILED DESCRIPTION

In its most general terms, the invention is understood as, and realized by, forming a multilayer dielectric optical waveguide on either a ternary or a quaternary III-V semiconductor compound substrate. Presence of additional semiconductor heterostructure or double heterostructure layers, such as layers 2, 3, 4, and 5 in the figures, provides insight only into the utility of the claimed invention as a means for monolithically integrating optical circuit components on a single substrate. Hence, the following description is intended not only to set forth the claimed invention in fundamental detail, but also to explain the implementation of the claimed invention in a monolithic integration environment.

Figure 1:
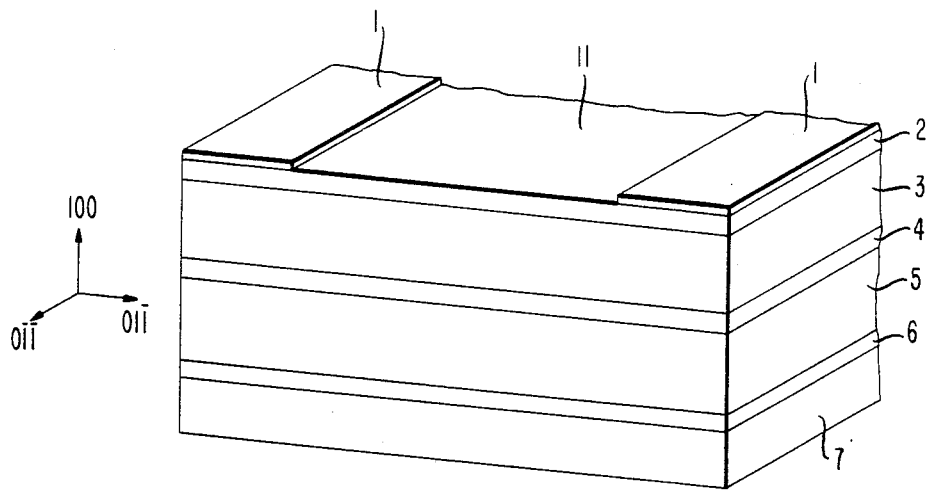
FIG. 1 shows a portion of a multilayer semiconductor heterostructure body having a stripe mask deposited on the (100) surface with the stripe along the $<011>$ direction.

The detailed description is organized by section to describe basic features of a heterostructure semiconductor body as shown in FIG. 1, surface preparation of the heterostructure semiconductor body to expose a flat ternary or quaternary waveguide substrate layer (FIGS. 2 through 5), and formation of either a one-dimensional (FIGS. 6, 7 and 8) or two-dimensional (FIGS. 6, 7, 9 and 10) dielectric optical waveguide on the exposed waveguide substrate layer.

Optoelectronic and integrated optics devices are grown in certain desirable crystallographic directions. For III-V semiconductor heterostructure devices such as lasers and the like composed of either InGaAsP/InP or AlGaAs/GaAs on a (100) substrate, a desired propagation direction is along the $<01\bar{1}>$ axis.

FIG. 1 shows a multilayer semiconductor heterostructure crystalline body having mask 1 on the (100) crystallographic plane. The semiconductor body, as stated above, is in either the InGaAsP/InP system or the AlGaAs/GaAs system. Also included in FIG. 1, as well as all subsequent figures, is a set of lattice basis vectors indicating the three-dimensional orientation of the semiconductor body.

The semiconductor heterostructure of FIG. 1 comprises mask layer 1, $p^+$-type cap layer 2, p-type upper cladding layer 3, n-type or undoped active layer 4, n-type lower cladding layer 5, n-type waveguide substrate layer 6, and n-type substrate 7. The conductivity type for each layer may be reversed so that each p-layer becomes an n-layer and each n-layer becomes a p-layer. Further, cap layer 2 is included only to show on exemplary embodiment of a heterostructure body. Alternative embodiments can be realized by omitting the growth of cap layer 2 from fabrication of the semiconductor heterostructure body.

Semiconductor materials for the heterostructure are chosen from the group of III-V compounds. In the InGaAsP/InP system, a binary III-V compound, InP, is employed for cladding layers 3 and 5 and for substrate 7. A quaternary III-V compound, $In_{1-y}Ga_yAs_xP_{1-x}$, is utilized for cap layer 2, active layer 4, and waveguide substrate layer 6 wherein the alloy composition ratios x and y are chosen to produce a particular wavelength or energy bandgap and lattice constant for the heterostructure. For a description of techniques for choosing x and y, see R. Moon et al, "Bandgap and Lattice Constant of GaInAsP as a Function of Alloy Composition", *J. Electron. Materials*, Vol. 3, p. 635 (1974). In the description which follows, exemplary composition ratios, x=0.52 and y=0.22, are selected to produce a wavelength of 1.3 μm (0.95 eV). It is important to note that the claimed invention is equally applicable when these ratios are varied to produce wavelengths in the range of 0.95 μm to 1.8 μm. For concentration ratios producing wavelengths above 1.5 μm, it is necessary to grow a quaternary antimeltback layer between layers 3 and 4 during liquid phase epitaxial growth of the heterostructure. The presence of such an antimeltback layer requires the surface preparation described below to be modified only slightly, in terms of etching exposure times, to provide acceptable results.

For a heterostructure body as shown in FIG. 1 in the InGaAsP/InP system, cap layer 2 is approximately 3000–5000 angstroms thick, cladding layers 3 and 5 are approximately 1.5–3 μm thick, active layer 4 and waveguide substrate layer 6 are approximately 1000–3000 angstroms thick, and substrate 7 is approximately 75–100 μm thick. Of course, for simplicity and clarity of explanation, layer thicknesses in FIGS. 1 through 10 are not necessarily drawn to scale.

In the AlGaAs/GaAs system, a binary III-V compound, GaAs, is employed for substrate 7. A ternary III-V compound, AlGaAs, is utilized for layers 2 through 6. Cap layer 2 utilizes $Al_qGa_{1-q}As$; cladding layers 3 and 5 utilize $Al_rGa_{1-r}As$ and $Al_uGa_{1-u}As$, respectively; active layer 4 utilizes $Al_sGa_{1-s}As$; and waveguide substrate layer 6 utilizes $Al_wGa_{1-w}As$. Alloy composition ratios q, r, s, u and w are chosen to produce a particular wavelength or energy bandgap and lattice constant for the heterostructure semiconductor body. In general, compositions ratios q, s, and w are chosen to be less than ratios r and u, and for symmetry purposes r and u are equal. A description of techniques for choosing the compositions ratios of the various AlGaAs layers is given by H. Kressel et a. in "Semiconductor Lasers and Heterojunction LEDs," pp. 357–363 (Academic Press: New York 1977).

Layer thicknesses for an AlGaAs/GaAs heterostructure body shown in FIG. 1 are substantially identical to those described above in relation to the InGaAsP/InP system, except substrate layer 6 are in the range 0.2 to 1.8 μm.

SURFACE PREPARATION FOR InGaAsP/InP SYSTEMS

A mask layer is deposited on the (100) plane of the InGaAsP/InP semiconductor body by any suitable deposition process such as chemical vapor deposition or the like. An exemplary layer is chemically comprised of silicon-nitride. Mask 1 is formed by photolithography and dry etching of the silicon nitride to have edges bordering the striped region which are substantially smooth. Striped regions in mask 1 leave surface areas such as surface 11 completely exposed, as opposed to being covered by mask 1. The stripe in mask 1 is aligned with the <011> direction of the semiconductor heterostructure body. Although this type of stripe mask produces a groove in the semiconductor body, other masks such as the one including only the left or right half of mask 1 as shown in FIG. 1 can be utilized to produce a single wall, i.e., for effectively slicing away an unmasked portion of the semiconductor body.

FIGS. 2, 3, 4, and 5 show structural changes which appear after the semiconductor heterostructure body of FIG. 1 is subjected to etchants in sequential etching process. The process illustrated by FIGS. 2 through 5 is called sequential etching because each layer of the multilayer structure directly under exposed surface 11 (FIG. 1) is etched away individually in sequence. That is, the portion of cap layer 2 directly under exposed surface 11 is etched away with a wet or dry chemical etchant to expose surface 12 on cladding layer 3. Since the etching process stops at a heterojunction, it is apparent that at least the wet chemical etchant must exhibit the property of material selectivity.

Several wet chemical etchants have been shown to be effective for selectively etching quaternary layers such as layers 2 and 4. Examples of several selective etchants include: a solution of $H_2SO_4:H_2O_2:H_2O=(10:1:1)$ as described in R. J. Nelson et al., "High-Output Power in InGaAsP/InP ($\lambda=1.3$ μm) Strip-Buried Heterostructure Lasers," *Applied Physics Letters*, Vol. 36, p. 358 (1980); or AB etchant, wherein the A solution is (40.0 ml. $H_2O+0.3$ g. $AgNO_3+40.0$ ml. HF) and the B solution is (40.0 g. $CrO_3+40.0$ ml. $H_2O$) and A:B=(1:1) as described in G. H. Olsen et al., "Universal Stain/Etchant for Interfaces in III-V Compounds," *Journal of Applied Physics*, Vol. 45, No. 11, p. 5112 (1974); or a solution of $KOH:K_3Fe(CN)_6:H_2O$. Etching time for the quarternary layers varies according to thickness of the quarternary layer, temperature, and alloy composition ratios, x and y, for the quaternary layers. For a 3000 angstroms thickness of layer 2 ($\lambda=1.3$ μm) and a temperature of 22 degrees Centigrade, the following approximate etching times produce the results shown in FIGS. 4 and 6: $H_2SO_4:H_2O_2:H_2O$ etch for approximately 5 seconds, AB etchant for approximately 15 seconds, and $KOH:K_3Fe(CN)_6:H_2O$ etch for approximately 8 seconds. This etching step is halted by rinsing the etched semiconductor body in deionized water.

Figure 2:
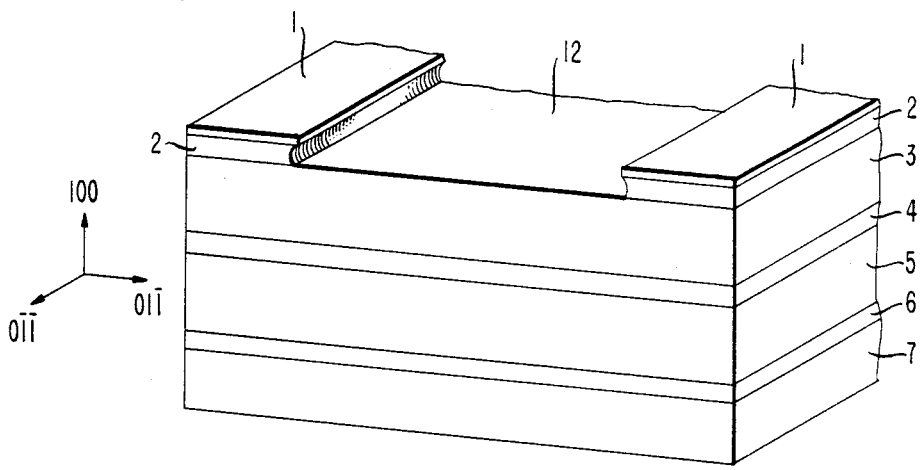
FIGS. 2, 3, 4 and 5 show structural changes of the semiconductor body of FIG. 1 after each of four sequential steps in an exemplary etching process for exposing smooth crystallographic surfaces.
Figure 3:
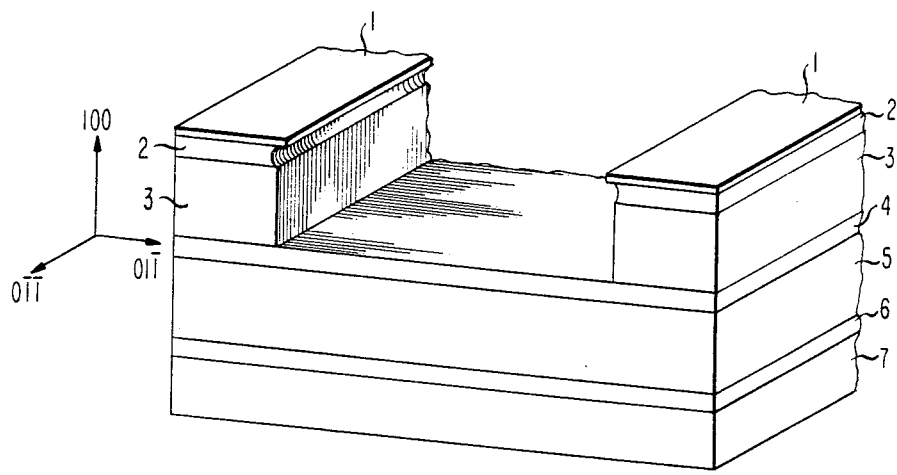

FIG. 3 shows the structural change of the semiconductor body in FIG. 2 after etching in an InP selective etch. For this etching step, HCl is a suitable etchant to cut away the portion of layer 3 under surface 12 (FIG. 2), thereby exposing surface 13 on quaternary layer 4. Although this etchant stops reacting automatically at surface 13, it must be carefully controlled to avoid causing a severe undercut in the remaining portions of layer 3 under mask 1. For an InP layer thickness of approximately 1.5 μm, an exemplary etching time period for concentrated HCl is approximately 45 seconds to produce the results shown both in FIG. 3 and FIG. 5. After this etching step, as shown in FIG. 3, it is important to note that the etched, exposed walls of layer 3 exhibit crystallographic smoothness.

Figure 4:
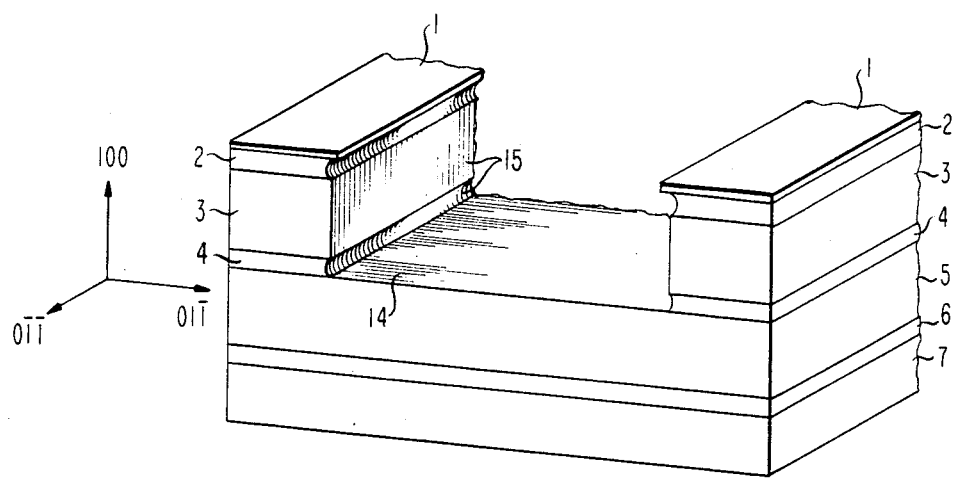

FIG. 4 illustrates the structural change apparent in the semiconductor heterostructure body, after the body shown in FIG. 3 is contacted with a wet chemical etchant to selectively etch quaternary layer 4 directly under surface 13 for a time period sufficient to expose surface 14 on layer 5. Also, crystallographic surface 15 is exposed at a definite slope to the surface containing mask 1 and surface 11 (FIG. 1), that is, the (100) plane The etching procedure and the etchants employed at this step have been described above in relation to FIG. 2.

Figure 5:
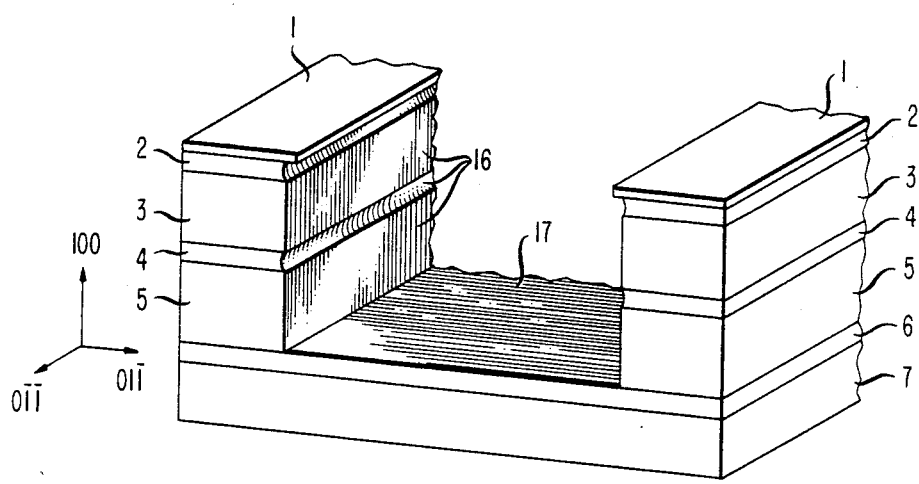

FIG. 5 shows the completion of all structural changes caused by the sequential etching process. Again, an InP selective etchant, HCl, is contacted with exposed surfaces of the semiconductor body to create an optically flat mirror facet at surface 15. In particular, surface 14 and crystallographic surface 15 are brought into contact, via immersion and agitation as described above, with a solution of HCl for a time period sufficient to expose a preferred crystallographic plane as the optically flat polished mirror facet and to expose a smooth, flat surface, surface 17, on waveguide substrate layer 6. As shown in FIG. 5, a crystallographic plane preferentially exposed by the HCl etchant is the $(01\bar{1})$ plane, denoted as surface 16, which is perpendicular to the (100) plane. Surface 16 is an optically flat mirror facet because HCl preferentially exposes the $(01\bar{1})$ crystallographic plane of only the InP layers, i.e., layers 3 and 5, and does not etch the quaternary layers, layers 2, 4 and 6. However, the etching process is controlled to make layers 2 through 5 substantially coplanar. For this example, the etching time period in a bath of concentrated HCl required to produce exposure of the $(01\bar{1})$ crystallographic plane at surface 16 and the flat surface 17 on waveguide substrate 6 is approximately 20 seconds.

Regardless of the semiconductor heterostructure system being employed, smoothness and flatness dimensions of surface 17 are important to subsequent fabrication of the dielectric optical waveguide thereon. As will become apparent below, the smoothness and flatness dimensions of surface 17 affect the smoothness and flatness dimensions of the walls of the dielectric optical waveguide. Excessive scattering losses result for a waveguide having rough walls. It is generally regarded that the smoothness of the waveguide walls be controlled to a tolerance of a fraction of the desired optical wavelength over a dimension of about five wavelengths. See, D. Marcuse, *Bell System Technical Journal*, Vol. 48, p. 3187 et seq. (1969), and also J. E. Goell et al., "Ion bombardment fabrication of optical waveguides using electron resist masks," *Appl. Phys. Lett.*, Vol. 21, pp. 72–83 (1972). Because the shape of the waveguide walls is directly determined by the shape of surface 17, tolerance control of the smoothness of surface 17 and waveguide substrate layer 6 is required during the epitaxial growth of the semiconductor heterostructure body.

SURFACE PREPARATION FOR AlGaAs/GaAs SYSTEMS

As described above, the semiconductor heterostructure body of FIG. 1 is alternatively comprised of multiple layers of AlGaAs having different composition ratios. Because the surface preparation techniques for an AlGaAs/GaAs heterostructure are different from those for an InGaAsP/InP heterostructure, only FIGS. 1 and 5 are of importance to the following description.

Several etching techniques are known for structurally altering an AlGaAs semiconductor body such as is shown in FIG. 1 by an amount sufficient to result in the grooved semiconductor body shown in FIG. 5 having substantially smooth and flat surfaces 16 and 17. One technique reported by J. L. Merz et al. in their IEEE J. of Quantum Electronics article entitled "GaAs Integrated Optical Circuits by Wet Chemical Etching," Vol. QE-15, pp. 72–82 (1979), involves the use of a two-step preferential etching process to produce flat surfaces. Another technique is disclosed by R. Logan et al. in U.S. Pat. No. 3,883,219 issued May 13, 1975. The Logan et al. technique involves a slow etching process using $Br_2$—$CH_3OH$.

After surfaces 16 and 17 in either heterostructure system have been exposed, mask 1 is removed by a conventional dry etching technique. One such dry etching technique is plasma etching in an atmosphere of $CF_4$. An optional step in surface preparation is to coat at least layer 16 with a reflective or anti-reflective coating by evaporation, for example, to ensure sufficient reflection or coupling, respectively, between layers 3, 4 and 5 and the dielectric optical waveguide to be formed on surface 17.

Anti-reflective coatings exhibit an index of refraction, $n_{ar}$, equal to the geometrical average of the indices of refraction, $n_4$ and $n_{40}$, for the core layers of the abutting active and passive waveguides, i.e., layers 4 and 40 (FIG. 7), respectively. That is, $$n_{ar} = (n_4 n_{40})^{\frac{1}{2}}.$$

The thickness of the anti-reflective coating layer, $l_{ar}$, is given by the expression, $$l_{ar} = \lambda/(4n_{ar})$$

where $\lambda$ is the desire wavelength of light. Materials which are suitable for evaporation onto surface 16 in an InGaAsP/InP system to form an anti-reflective coating layer are metal oxides such as $Ta_2O_5$ and $TiO_5$.

Figure 7:
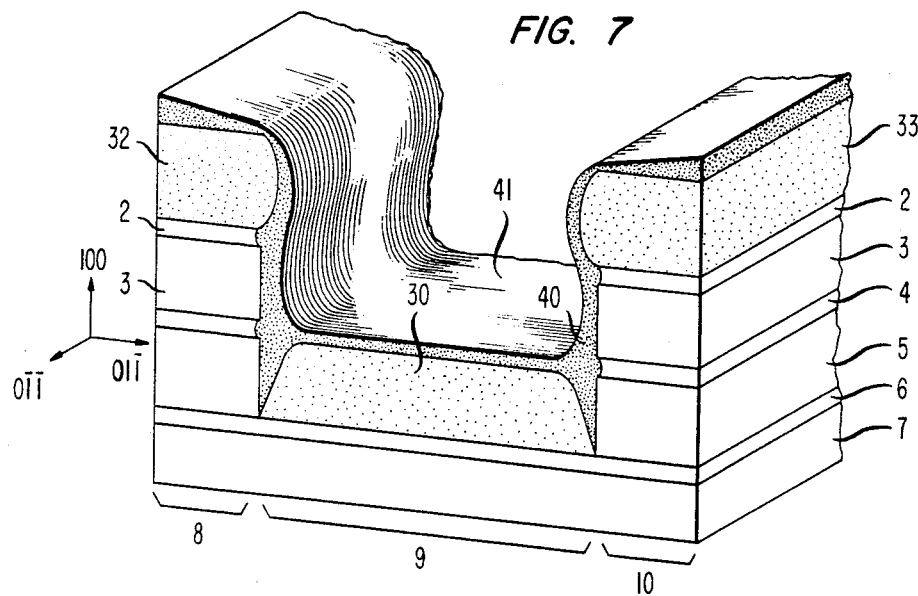
FIG. 7 shows formation of a second dielectric waveguide layer on surface 31 of the semiconductor and dielectric body of FIG. 6.

Reflective coatings possess an index of refraction, $n_R$, lower than the index, $n_{40}$, for the core layer of the passive dielectric waveguide, layer 40 (FIG. 7). The thickness of the reflective coating, $l_R$, formed by evaporation, for example, is given by the expression, $$l_R = \lambda/(4n_R).$$

An exemplary reflective coating material is $MgF_2$ which has a refractive index $n_R$ equal to 1.35. With this coating material as a reflective layer on surface 16 in an InGaAsP/InP with a polyimide/$SiO_x$ waveguide, to be described below, the reflectivity increases by approximately 100 percent.

FORMATION OF ONE-DIMENSIONAL WAVEGUIDE

Figure 6:
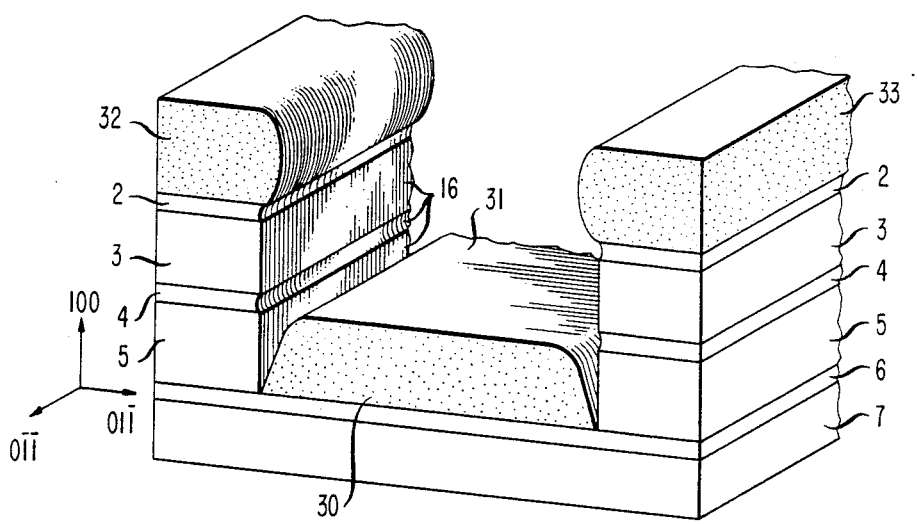
FIG. 6 shows formation of a first dielectric waveguide layer on surface 17 of the semiconductor body of FIG. 5.
Figure 8:
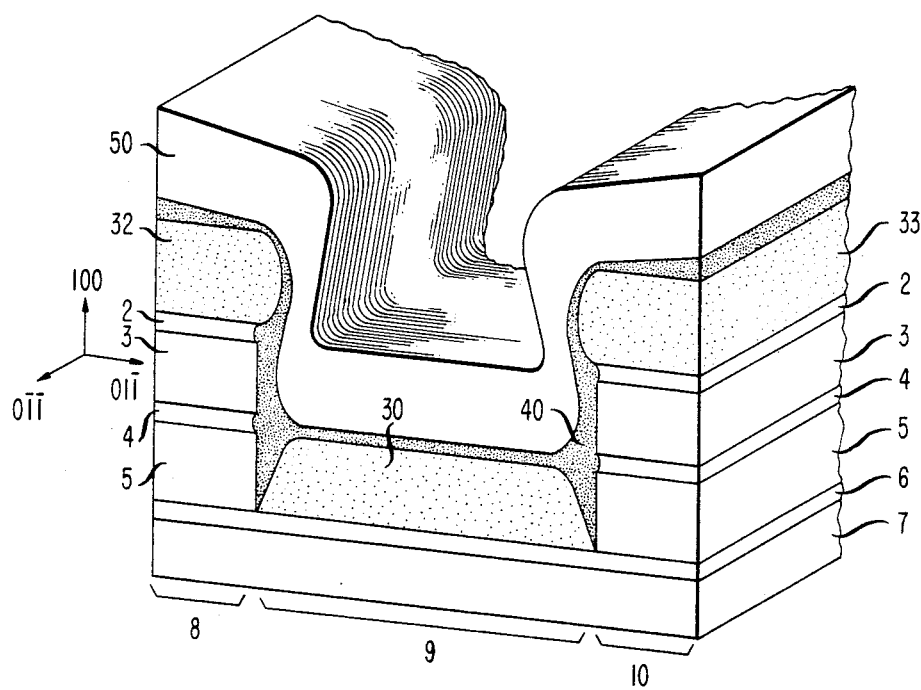
FIG. 8 shows formation of a third dielectric waveguide layer on surface 41 of the semiconductor and dielectric body of FIG. 7.
Figure 9:
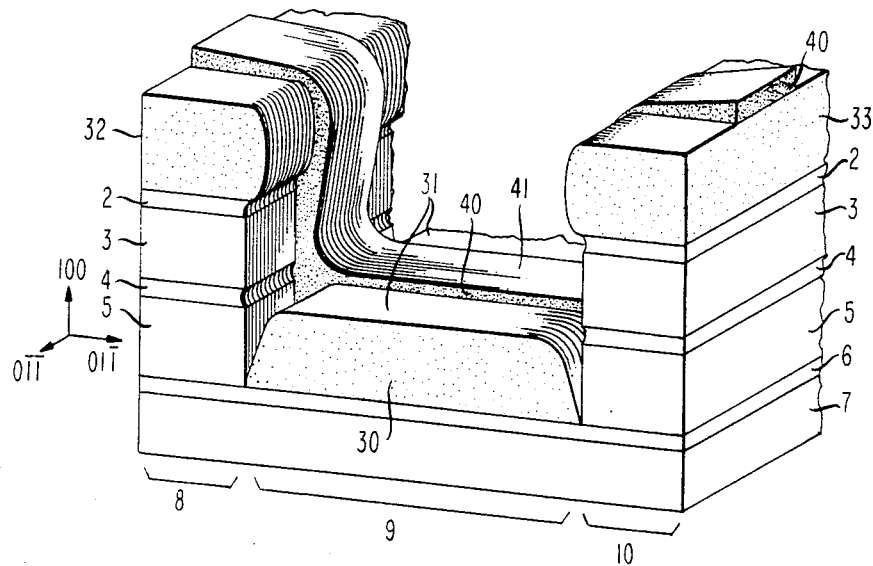
FIG. 9 shows structural changes of the semiconductor body of FIG. 7 after removal of selected portions of the second dielectric waveguide layer.
Figure 10:
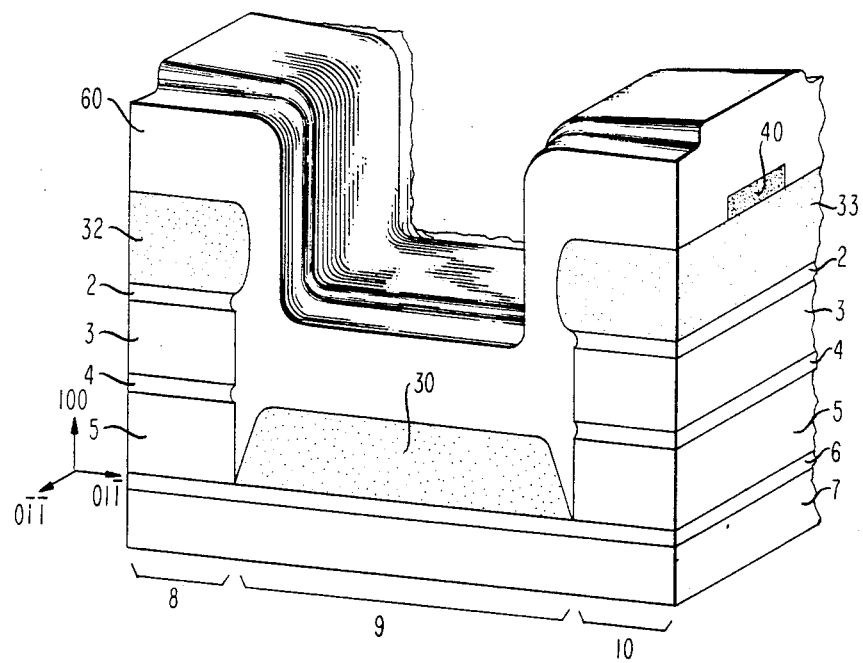
FIG. 10 shows formation of the third dielectric waveguide layer layer on the semiconductor and dielectric body of FIG. 9.

FIGS. 6, 7 and 8 show successive illustrative steps for fabricating a one-dimensional dielectric optical waveguide on waveguide substrate layer 6 in the semiconductor heterostructure body shown in FIG. 5.

A typical dielectric optical waveguide comprises an elongated core of dielectric material surrounded by a medium having a lower index of refraction. When a cross-section of such a waveguide is viewed perpendicular to its optical axis ($<01\bar{1}<$ direction), it is apparent that the waveguide confines light in two dimensions, the $<100>$ and $<0\bar{1}1>$ directions. Hereinafter, this type of structure is referred to as a two-dimensional waveguide and will be discussed later in more detail. However, when the elongated core is covered by the lower index of refraction medium on only two parallel sides, light is confined in only one dimension ($<100>$ direction, for instance). This latter type of structure is referred to as a one-dimensional waveguide whose formation is discussed immediately below.

Formation of a dielectric optical waveguide on surface 17 of waveguide substrate layer 6 begins in FIG. 6 with controlled deposition of a dielectric material, such as silicon oxide ($SiO_x$, $x \sim 2$) to form first waveguide layer 30 only on surface 17. The dielectric material chosen to form first waveguide layer 30 exhibits an index of refraction lower than that of waveguide substrate layer 6. Deposition of the dielectric material is required to be highly controlled in order to avoid having the first waveguide layer dielectric material attach to surface 16 and, in particular, to surface 16 above an interface between layers 4 and 5.

Two low temperature techniques have been developed for controlled, directional deposition of $SiO_x$ on layer 6. One technique involves thermal evaporation of a silicon monoxide, SiO, source in an oxygen atmosphere. Another technique involves electron beam evaporation of a silicon dioxide, $SiO_2$, source in a vacuum.

In the thermal evaporation technique, the semiconductor body of FIG. 5 is placed in an oxygen ($O_2$) atmosphere of approximately $2.0 \times 10^{-4}$ mbar. Current is controllably supplied to a tantalum filament for evaporating the SiO source. It is this current which controls the evaporation rate of the source SiO and also the deposition rate of $SiO_x$ on surface 17 of layer 6. As stated above, deposition of $SiO_x$ is directional in that particles of SiO and $SiO_2$ are in a substantially collision-free environment and attach only on a (100) plane, i.e., surface 17 and other surfaces parallel thereto. An exemplary deposition rate which yields a controlled, directional deposition for first waveguide layer 30 is approximately 5 angstroms per second or 0.03 $\mu$m/min. The $O_2$ atmosphere can be varied to change the proportion of SiO to $SiO_2$ in layer 30. Of course, such variations of the $O_2$ atmosphere also affect the index of refraction for layer 30 as SiO has a refractive index of 1.90 and $SiO_2$ has a refractive index of 1.46. For the exemplary $O_2$ atmosphere given above, the resulting stoichiometry of layer 30 is $SiO_x$ ($x \sim 2$), a hetergeneous composition of SiO and $SiO_2$ resembling $SiO_2$ with an index of refraction of 1.50.

The second deposition technique, as stated above, involves electron beam evaporation of a $SiO_2$ source in a vacuum. An exemplary vacuum useful for this technique is approximately $10^{-6}$ torr. In this technique, the semiconductor body of FIG. 5 is placed in an evacuated chamber with a crucible containing the $SiO_2$ source. An electron beam of sufficient power is focused on the source causing evaporation of $SiO_2$. The power of the beam is carefully monitored to control the deposition rate, whereas the vacuum pressure is controlled to produce a directional flow of $SiO_2$ only to those exposed surfaces parallel to surface 17 ((100) plane). Throughout this deposition process, the semiconductor body is at room temperature. Hence, the bond which occurs at the interface between layers 6 and 30 is an incomplete chemical bond.

First waveguide layer 30 is adjacent to layer 5 of the semiconductor heterostructure body, but does not completely abut surface 16 of layer 5. Surface 31 is the exposed surface of first waveguide layer 30. Surface 31 exhibits essentially the same flatness and smoothness dimensions, that is, planarity, as surface 17 except in a narrow region near surface 16 where layer 30 is tapered. This narrow region of taper extends not more than 0.3 $\mu$m from surface 16.

Layer 30 acts as a lower cladding layer for the dielectric optical waveguide. In general, layer 30 is approximately as thick as layer 5. In order to avoid radiation loss by evanescent coupling through the waveguide into layer 6, it is desirable for layer 30 to have an approximate thickness of at least 1 $\mu$m and, preferably, 2.0 $\mu$m. The thickness of layer 30 also determines the position of a waveguide core layer, to be formed later, with respect to layer 4. Layer 30 should be sufficiently thick in order to maximize the transmission coefficient from semiconductor core layer 4 to an abutting dielectric optical waveguide core layer (FIG. 7, layer 40), that is, mode profile matching between layer 4 and the dielectric waveguide. Mode profile matching is described below in more detail.

Layers 32 and 33 shown in FIG. 6 are also layers of $SiO_x$ ($x \sim 2$). These layers are on layer 2 on the semiconductor body. Removal of layers 32 and 33 to allow contact attachment is accomplished with well known photoresist exposure and developing techniques. However, for the purposes of this description, removal of layers 32 and 33 is not undertaken.

FIG. 7 shows the formation of second waveguide layer 40 on surface 31 of first waveguide layer 30 and abutting surface 16 of the semiconductor heterostructure body. Layer 40 is comprised of a dielectric material having an index of refraction higher than the refractive index of layer 30. Waveguide layer 40 acts as a core layer of the waveguide. As such, it is desirable for the dielectric material chosen for layer 40 to exhibit optical transparency to the wavelength or wavelengths of light intended for propagation therein.

In one exemplary embodiment of this invention, an organic polyimide coating material such as PYRALIN (a trademark of E. I. DuPont de Nemours and Company) polyimide coating, PI2555, is employed for forming dielectric waveguide layer 40. See, also, U.S. Pat. Nos. 3,179,614 and 3,179,634 issued to W. Edwards on Apr. 20, 1965. PYRALIN polyimide coating has a refractive index of approximately 1.70 and is transparent after 100 percent imidization to optical wavelengths in the range 0.85 to 1.8 $\mu$m.

Second dielectric waveguide layer 40 with PYRALIN polyimide coating is formed by performing the following steps. The semiconductor and dielectric body of FIG. 6 is treated with a material to promote adhesion of layer 40 to surfaces 16 and 31. One exemplary adhesion promoter is sold under the product name VM-651 by E. I. DuPont de Nemours and Company. Next, the polyimide coating film is applied to the semiconductor and dielectric body. Removal of air bubbles present in the polyimide coating film is accomplished by then placing the semiconductor and dielectric body in a vacuum chamber for a short period of time. At this point the polyimide coating film forming layer 40 is in complete contact with at least surfaces 16 and 31, as shown in FIG. 7. The body of FIG. 7 is then placed on a rotating table or spinner at room temperature, where it is held in place by a vacuum and rotated at a speed in the range 3000 to 7000 rpm. for approximately 2 minutes. Speed of rotation and viscosity of the polyimide coating film determine the thickness of layer 40 in the $<100>$ direction. An exemplary range of thickness for polyimide coating film as layer 40 is approximately 0.3 to 1.2 $\mu$m. Curing of the spun polyimide coating film is accomplished by baking the semiconductor and dielectric body of FIG. 7 for a time, and at a temperature, sufficient to permit 100 percent imidization. In one example, curing was accomplished by baking at 200 degrees Centigrade for about 2 hours. Surface 41 of layer 40 is substantially flat and smooth throughout dielectric waveguide region 9.

Semiconductor regions 8 and 10 are identical for illustrative purposes to locate active optical circuit components interconnected by the dielectric waveguide.

As depicted by FIG. 7, the two-layer dielectric structure including layers 30 and 40 is a one-dimensional waveguide capable of lightwave propagation. The dielectric waveguide joins to semiconductor regions 8 and 10 with a butt-end interface. The semiconductor and dielectric body of FIG. 7 is monolithically integrated optical circuit.

FIG. 8 shows an optional third dielectric waveguide layer 50 covering surface 41 and layer 40. Layer 50 is a dielectric material having an index of refraction less than the index of refraction for layer 40. Thus, layer 50 acts as a cladding layer for the dielectric core layer. Furthermore, layer 50 passivates surface 41 and the entire integrated optical circuit. Deposition or spin-coating are suitable techniques for fabricating layer 50.

In an example from practice, thermal evaporation of silicon monoxide, SiO, in an oxygen atmosphere is used to deposit a $SiO_x$ ($x \sim 2$) layer, as layer 50, on surface 41. The thermal evaporation technique is described above in relation to fabrication of layer 30.

FORMATION OF TWO-DIMENSIONAL WAVEGUIDE

FIGS. 6, 7, 9 and 10 show successive illustrative steps for fabricating a two-dimensional dielectric optical waveguide on waveguide substrate layer 6 in the semiconductor body shown in FIG. 5.

After layer 40 is spin-coated on surface 31 and prior to curing (see FIG. 7), the polyimide coating film is partially cured by baking the film to effect less than 100 percent imidization, for example, at 130 degrees Centigrade for about 5 minutes. Partially cured polyimide is solvable in certain solutions.

Patterning of partially cured layer 40 is performed using a standard photoresist such as AZ1350J to produce an appropriate shape and transverse width ($<01\bar{1}>$ direction) for the core layer of the dielectric waveguide. The photoresist is developed. Then, selected portions of layer 40 are removed by etching with AZ303 developer. The remaining unetched portions of layer 40 are fully cured by baking at 200 degrees Centigrade for approximately 2 hours.

Cladding layer 60 is then formed on exposed surfaces 31 and 41 to fully encapsulate the waveguide core layer, layer 40. Formation of layer 60 is accomplished by means identical to those used for formation of layer 50 in FIG. 8. Layer 60 has all of the same properties as those described above for layer 50.

MODE PROFILE MATCHING

For maximum transmission efficiency at the interface (surface 16) of the active and the passive waveguide, field distribution profile of propagation modes in both waveguides should be matched, i.e., mode profile matching. Theoretically ideal mode profile matching is obtained under the following condition:

$$T_8 = T_9 \text{ and } t_4 = t_{40},$$

where $$T_8 = \left[ \frac{n_4^2 - n_{3,5}^2}{2n_4^2} \right]^{\frac{1}{2}} \cdot n_4 t_4, \text{ and}$$

$$T_9 = \left[ \frac{n_{40}^2 - n_{30,50,60}^2}{2n_{40}^2} \right]^{\frac{1}{2}} \cdot n_{40} t_{40}, \text{ and}$$

where $n_{3,5}$ and $n_{30,50,60}$ are the refractive indices of the respective cladding layers (subscripts) in regions 8 or 10, and 9, respectively.

For a more practical, non-ideal mode profile matching condition, the degree of matching is expressed by $\eta_{mpm}$, the mode profile matching coefficient. $\eta_{mpm}$ is expressed as follows:

$$\eta_{mpm} = \frac{[\int G_8(\beta - \alpha) G_9(\beta) d(\beta)]^2}{\int G_8^2(\beta) d\beta \cdot \int G_9^2(\beta) d\beta}$$

where $G_i(\beta)$ is the field distribution profile of a propagation mode in region i, i=8, 9, $\beta$ is a layer thickness coordinate in the <100> direction, and $\alpha$ is an offset distance measured in the <100> direction between the physical center axes of the waveguides in regions 8 and 9. Field distribution profiles for $G_i(\beta)$ are found in the literature, for example, in D. Marcuse, "Light Transmission Optics," Van Nostrand, 1972. A table has been included below to show variation of the mode profile matching coefficient as a function of center offset for several different thicknesses of layer 40, $t_{40}$.

| OFFSET | MODE PROFILE MATCHING COEFFICIENT. $\eta_{mpm}$ | | |
|---|---|---|---|
| $\alpha(\mu m)$ | $t_{40} = 0.3\ \mu m$ | $t_{40} = 0.6\ \mu m$ | $t_{40} = 0.9\ \mu m$ |
| 0.0 | 0.88 | 0.96 | 0.93 |
| 0.1 | 0.85 | 0.91 | 0.90 |
| 0.2 | 0.78 | 0.83 | 0.82 |
| 0.3 | 0.68 | 0.71 | 0.71 |
| 0.4 | 0.57 | 0.57 | 0.57 |
| 0.5 | 0.47 | 0.43 | 0.45 |

For the table above, it is assumed that a polyimide/SiO₂ dielectric waveguide is in an InGaAsP/InP heterostructure system where the thickness of layer 4, $t_4$, is 0.15 $\mu m$ and $\xi$ is 1.3 $\mu m$.

What is claimed is:

1. An integrated optical device, comprising:
   a substrate which includes a first surface;
   a material region overlying said first surface, which region includes direct bandgap semiconductor material and is capable of emitting light upon the application of energy, said region also including a second surface, from which light exits, inclined relative to said first surface, characterized in that
   said device further comprises a waveguide overlying said first surface and including a core, said core including dielectric material essentially free of semiconductor material and two surfaces substantially parallel to one another and to said first surface, and said core also abutting at least a portion of said second surface.

2. The device of claim 1 wherein said waveguide further includes a first cladding region overlying said first surface, said core overlying said first cladding region, the refractive index of said core being higher than that of said first cladding region.

3. The device of claim 2 wherein said first cladding region includes silicon and oxygen.

4. The device of claim 2 wherein said waveguide further includes a second cladding region overlying said core, the refractive index of said core being higher than that of said second cladding region.

5. The device of claim 1 wherein said dielectric material includes polyimide.

6. The device of claim 1 wherein said material region includes a heterostructure comprising first and second portions which include III-V semiconductor material, said first portion overlying said first surface, said second portion contacting at least a part of said first portion, a heterojunction existing at the interface between said first and second portions.

7. The device of claim 6 wherein said heterostructure further comprises a third portion which includes III-V semiconductor material and contacts at least a part of said second portion, a heterojunction existing at the interface between said second and third portions.

8. The device of claim 6 wherein said first portion includes InP and said second portion includes $In_{1-y}Ga_yAs_xP_{1-x}$.

9. The device of claim 6 wherein said first portion includes $Al_rGa_{1-r}As$ and said second portion includes $Al_sGa_{1-s}As$.

10. A method for fabricating an optical device, comprising the step of:
   forming a material region overlying a first surface of a substrate, which region includes direct bandgap semiconductor material and is capable of emitting light upon the application of energy, said material region including a second surface, from which light exits, inclined relative to said first surface, characterized in that said method further comprises the step of forming a waveguide overlying said first surface, said waveguide including a core, said core including dielectric material essentially free of semiconductor material and two surfaces substantially parallel to one another and to said first surface, said core also abutting at least a portion of said second surface.

11. The method of claim 10 wherein said waveguide further includes a cladding region overlying said first surface, said core overlying said cladding region, the refractive index of said core being higher than that of said cladding region.

12. The method of claim 11 wherein said cladding region includes silicon and oxygen.

13. The method of claim 12 wherein the formation of said cladding region includes the step of thermally evaporating said silicon and oxygen onto said first surface.

14. The method of claim 12 wherein the formation of said cladding region includes the step of electron-beam-evaporating said silicon and oxygen onto said first surface.

15. The method of claim 10 wherein said core includes polyimide.

16. The method of claim 15 wherein the formation of said core includes the step of spin-depositing said polyimide.

* * * * *

UNITED STATES PATENT AND TRADEMARK OFFICE
CERTIFICATE OF CORRECTION

PATENT NO. : 4,582,390
DATED : April 15, 1986
INVENTOR(S) : Kazuhito Furuya

It is certified that error appears in the above-identified patent and that said Letters Patent is hereby corrected as shown below:

In the Specification, Column 7, line 60, "$(4n_{ar})$" should read --$4n_{ar}$--. Column 8, line 5, "$(4n_R)$" should read --$4n_R$--; line 24, "$<01\bar{1}<$" should read --$<01\bar{1}>$--. Column 12, line 17, "$\xi$" should read --$\lambda$--.

Signed and Sealed this

Twenty-eighth Day of October, 1986

[SEAL]

*Attest:*

DONALD J. QUIGG

*Attesting Officer*   *Commissioner of Patents and Trademarks*